United States Patent
Talonn

[15] 3,650,466
[45] Mar. 21, 1972

[54] SLOPE CALCULATOR
[72] Inventor: Daniel A. Talonn, University City, Mo.
[73] Assignee: Sherwood Medical Industries Inc.
[22] Filed: Aug. 8, 1969
[21] Appl. No.: 849,608

[52] U.S. Cl. ............................................. 235/61 B, 33/75
[51] Int. Cl. ................................. B43i 7/00, B43i 13/00
[58] Field of Search .................. 235/61 B, 61 GM; 33/75, 76, 33/1 C

[56] References Cited

UNITED STATES PATENTS

| | | | |
|---|---|---|---|
| 1,566,881 | 12/1925 | Kerr | 33/75 |
| 1,907,873 | 5/1933 | Richards et al. | 33/75 |
| 1,933,880 | 11/1933 | Tihenko | 33/75 |
| 1,955,392 | 4/1934 | Shimberg | 235/61 X |
| 2,605,961 | 8/1952 | Glasser | 235/61 |
| 3,388,474 | 6/1968 | Rosenvold et al. | 33/1 |
| 3,460,261 | 8/1969 | Frey | 33/75 |

Primary Examiner—Richard B. Wilkinson
Assistant Examiner—Stanley A. Wal
Attorney—Donald S. Olexa, Jerome M. Teplitz and John G. Heimovics

[57] ABSTRACT

A manually operable computer for slope calculations and in particular for calculating air flow rates from a patient's spirogram including a circular indicating disc with a diametral line thereon positionable coincident to the slope of the spirogram tracing to be measured and a scale member with an annular portion surrounding and pivotally mounted with respect to the circular disc, there being provided a projection from the annular portion that is adapted to be aligned with one of the coordinates of the spirogram after the circular disc line is positioned, there being also provided cooperating indicator and scales on the members that give a direct visual readout of the patient's respired air flow rate in volume per unit time.

11 Claims, 8 Drawing Figures

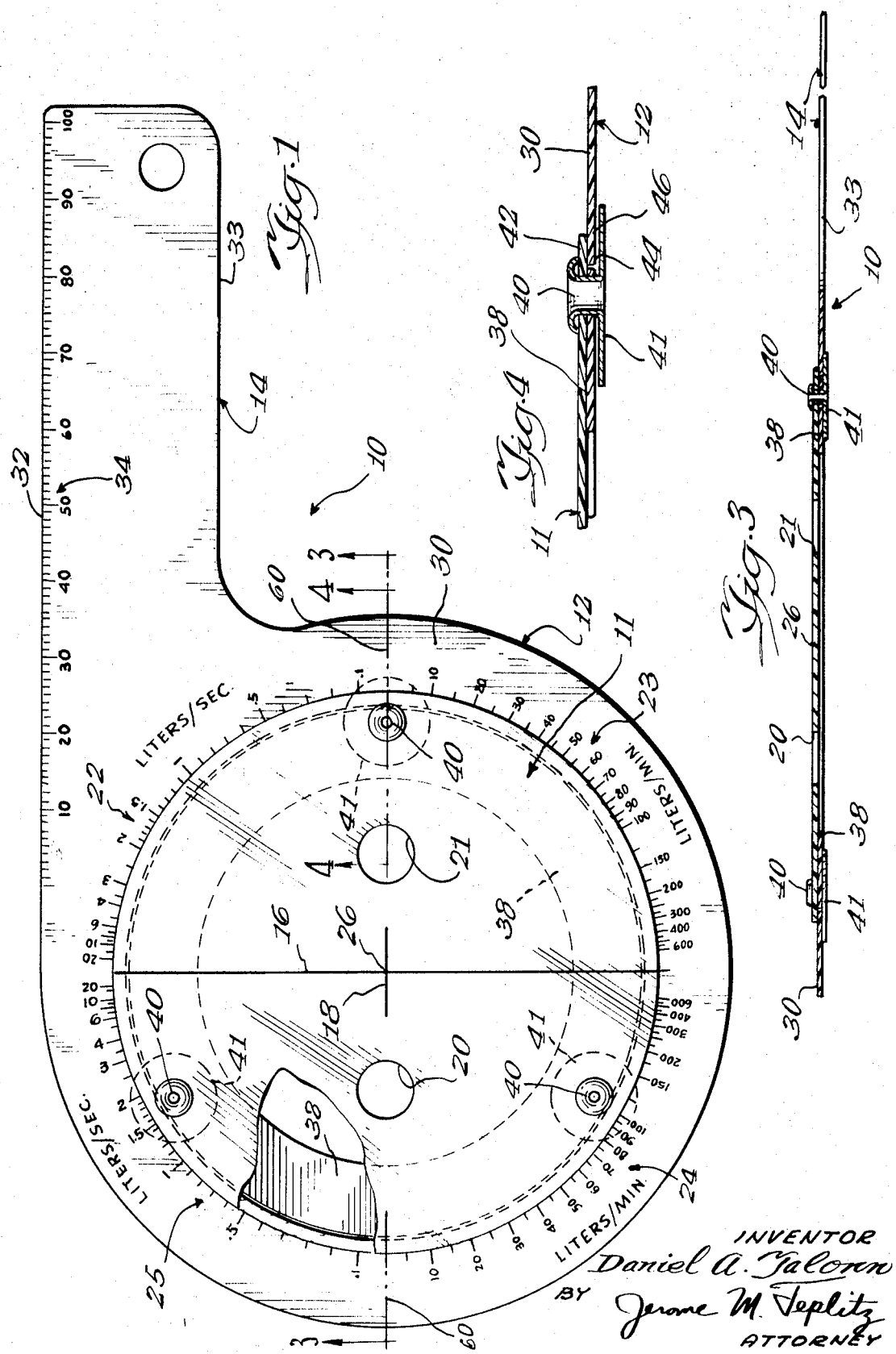

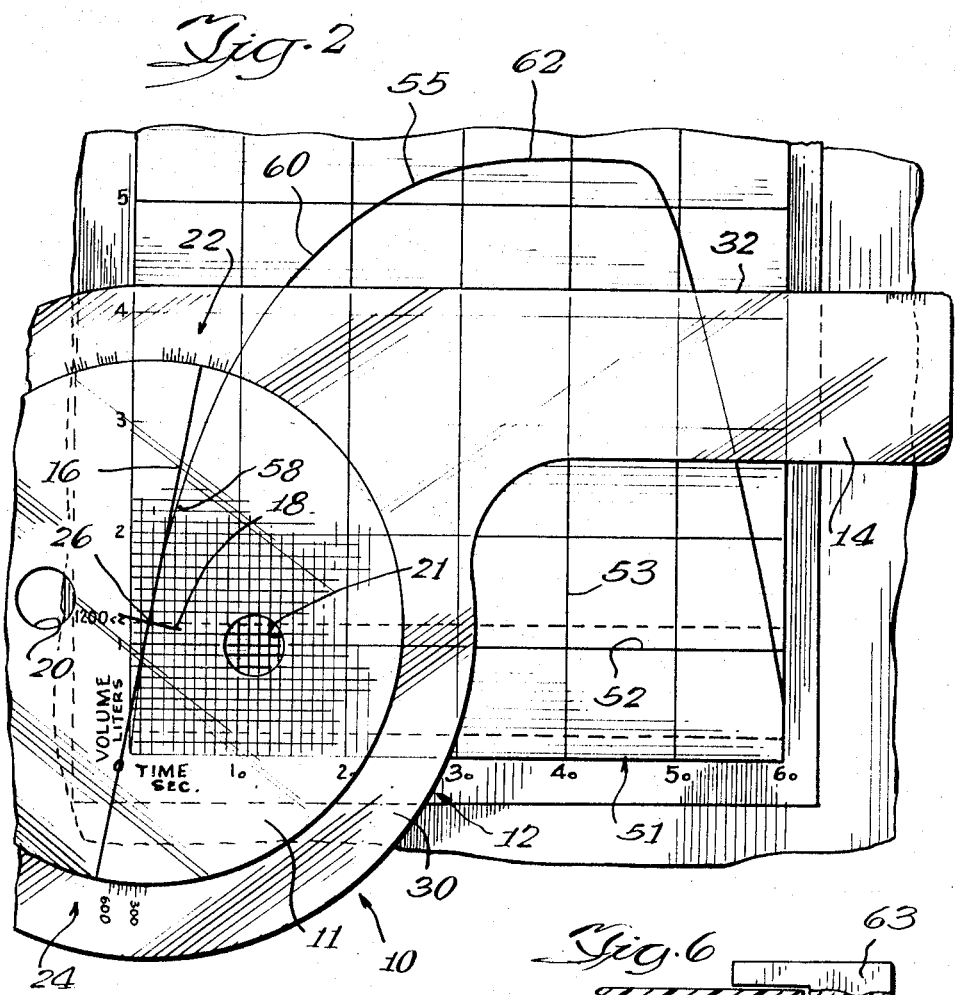
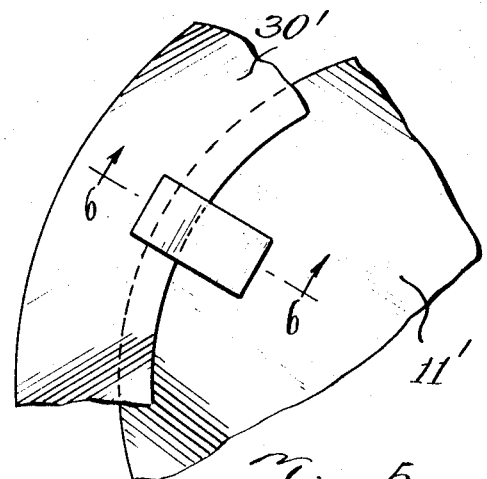
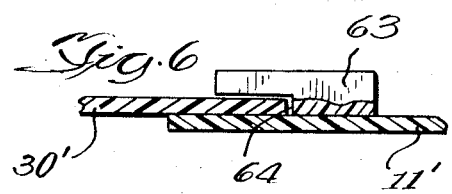
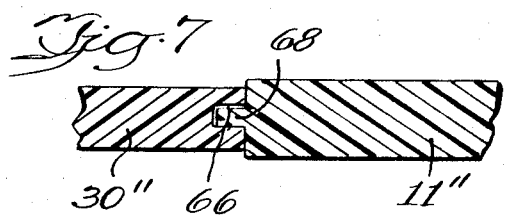
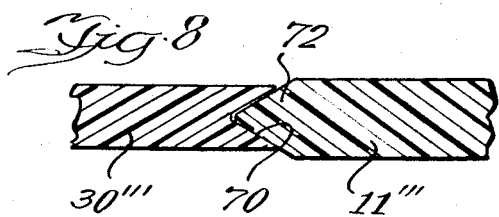

SLOPE CALCULATOR

BACKGROUND OF THE INVENTION

The present invention relates to a slope calculator and in particular for use in spirometry. A manual calculator is provided for determining a patient's air flow rate at any time during the breathing cycle from a spirogram tracing. The volume of air, the flow rates of air during certain portions of the breathing cycle and other parameters relating to the breathing functions are of significance in the diagnosis of certain diseases such as asthma and emphysema.

The maximal expiratory flow rate (MEFR), the maximal mid-expiratory flow (MMF), and the forced expiratory flow (FEF) are parameters commonly employed in evaluating the patient's condition. The present device has the capability of calculating these parameters directly from a spirogram.

A spirogram is a recorded tracing commonly produced by many spirometers in wide use today. One spirometer in use today includes an expandible and retractable bellows into which the patient exhales or inhales. A portion of the bellows carries a marking stylus that scribes the tracing on a record. The record conventionally consists of a strip of paper driven at a constant speed with respect to the bellows to provide the proper time base for the spirogram. The resulting record, i.e., spirogram, is a graph of the patient's exhaled or inhaled air volume versus time which of course indicates how much air a patient exhales or inhales in a given length of time. It should be noted that a patient's inhaling rate is of equal importance to exhaling rate and is likewise measured on the same instrument and the measurements are taken from the recorded tracing. Inhaling rates are usually referred to as negative rates.

In order to determine the various flow rate parameters set forth above it is necessary to calculate the slope of the spirogram tracing at the desired time interval during the breathing cycle. The slope of the line is a mathematical representation of the first differential of the volume versus time tracing and thus yields volume per unit time or, more specifically in this application, flow rate.

In the past, it has been conventional to both calculate the flow rates through mathematical computation from the spirogram and also to use various devices that give a direct reading of flow rate although the latter devices have significant disadvantages.

One method of calculating the flow rate mathematically at a given instant in the breathing cycle is to draw a line tangent to the spirogram tracing at the point where measurement is desired. Ordinate and abscissa lines are then drawn for this tangent line and the ordinate value (volume) is then divided by the abscissa value (time) resulting in the flow rate at that instant in volume per unit time, such as liters per second. This mathematical method is extremely time consuming and for that reason various devices have been devised which will provide a direct reading of flow rate from the spirogram tracing.

One device of this character includes a transparent overlay that is aligned with the spirogram tracing and has a plurality of straight lines radiating from a single point. Each of the lines represents a specific flow rate and flow rate is determined by shifting the overlay along the spirogram until the line which is most tangent to the desired point on the tracing intersects that point. There are several disadvantages to this overlay flow rate determining mechanism. One obvious one is that in order to accurately calculate flow rates it would be necessary to have an infinite number of these radiating lines and of course, the more lines on the overlay the closer together the lines are and the more difficult it is to accurately select the line most nearly matching the tangent of the spirogram tracing. Another disadvantage is that the template cannot vary from true parallelism with the spirogram record and it must be moved along the record until overlap with one of the lines occurs. In some systems it is recommended that a tangent line be drawn on the record at the selected point after which time the template or overlay is aligned with the tangent line for reading. Drawing the tangent line is time consuming. It is difficult to maintain template parallelism and to match the slopes of the lines and these factors render an accurate reading very difficult to obtain.

It is the primary object of the present invention to provide a calculator that rapidly and accurately determines slopes such as for flow rates from a spirogram eliminating the above disadvantages in prior methods.

SUMMARY OF THE PRESENT INVENTION

According to the present invention a manually operated slope calculator is provided for determining air flow rates from a spirogram tracing that includes a central transparent indicator disc surrounded by a rotatably mounted scale member which may have a tangentially extending alignment portion. The circular indicating disc has a central cross-hair intersecting the diametral line and the disc is initially positioned so that the line is tangent to the curve and the cross-hair intersects the curve at the point on the tracing where measurement is to be made. If desired, the point at which measurement is to be made may be initially marked on the record tracing. With the central disc held firmly in this position the surrounding scale member is rotated so that the tangential portion is parallel with the abscissa of the spirogram. If the spirogram is on graph paper the tangent arm can be positioned parallel to any one of the horizontal grid lines thereon.

The diametral line on the central disc then points at a mark on the scale in the surrounding scale member and the flow rate can be read therefrom directly by the operator. The scale, for example, may be calibrated in liters per second or liters per minute.

In cases where it is desired to compute "average" flows two points may be marked on the spirogram tracing and the diametral line on the central disc initially is positioned to intersect the curve through both of the points. In this manner an average flow rate may be computed.

A scale is provided on the tangential arm which can be used between the base line of the record and the line through the maximum point on the plotted tracing for finding the 25 percent, 50 percent, 75 percent and the like points on the tracing so that additional readings can be taken from the tracing.

BRIEF DESCRIPTION OF THE DRAWINGS

FIG. 1 is a plan view of a calculating device according to one embodiment of the present invention;

FIG. 2 is a fragmentary view of the present calculator shown in its operative position with respect to a spirogram;

FIG. 3 is a cross-section taken generally along line 3—3 of FIG. 1;

FIG. 4 is a fragmentary section taken generally along line 4—4 of FIG. 1;

FIG. 5 is a fragmentary view of another embodiment of the present invention;

FIG. 6 is a fragmentary section taken generally along line 6—6 of FIG. 5;

FIG. 7 is a fragmentary section of another form of interconnection between the two members in the present calculator; and FIG. 8 is a fragmentary section of still another form of the interconnection between the two members of the present device.

DETAILED DESCRIPTION OF THE PREFERRED EMBODIMENTS

Referring to the drawings and particularly FIGS. 1, 3 and 4, a slope calculator is provided in the form of a spirogram calculator 10 which consists generally of a central transparent plastic circular indicator disc 11 surrounded by a rotationally mounted scale 12 having a tangentially disposed arm portion 14. The scale 12 may also be constructed of a transparent plastic.

The central circular disc 11 has a diametral line 16 thereacross with a centrally disposed cross-hair 18. Openings 20 and 21 are provided in the circular disc for the purpose of receiving the operator's fingers to firmly hold the disc 11 in a fixed position with respect to the spirogram during operation of the device. As will appear, the line 16 serves not only to represent the tangent line to the spirogram tracing but also comprises an indicator for cooperating with the scales 22, 23, 24 and 25 disposed in arcuate fashion on the annular scale 12 with respect to the center point 26 defined by the intersection of diametral line 16 and cross-hair 18.

As shown in FIG. 1, the scales in opposite quadrants may be different. For example, scale 22 is in liters per second while the opposed scale 24 in the opposite quadrant is in liters per minute. Moreover, scales 22 and 24 provide flow rate readings for the positive slopes (expiration) while the scales 23 and 25 provide flow rate readings for negative slope (inhalation) tracings. The scales 22, 23, 24 and 25 are calibrated in accordance with the scale of the specific spirogram employed with the device, as will be apparent to those skilled in the art.

The arm 14 of the scale 12 is generally tangent to annular portion 30 of the scale 12 and has two parallel straight edges 32 and 33 which define an alignment means for aligning the arm 14 with one of the horizontal grids of the spirogram. A scale 34 may be provided adjacent edge 32 of arm 14. Either edge 32 or 33 can be aligned with a horizontal grid to effect the reading. In fact, when a reading is being taken near the upper right corner of the record, the arm 14 is pivoted 180° so that the edges 32, 33 can be aligned with a grid line on the left hand side of the record 51.

The disc 11 is accurately located with respect to the scale 12 but is pivotally mounted with respect thereto. Toward this end a transparent plastic annular ring 38 is provided as shown in FIGS. 1 and 4 which has an outside diameter slightly less than the diameter of disc 11. The ring 38 is fixed with respect to the disc 11 by eyelets 40 which have enlarged base portions 41 that define, with the peripheral edge 42 of disc 11, recesses 44 which slidably receive inner edge 46 of the annular scale portion 30. In this manner the disc 11 is retained with respect to the scale 12 but free rotation is permitted between these members.

The operation of the embodiment of FIGS. 1, 3 and 4 is best exemplified with reference to FIG. 2 where the calculator 10 is shown with reference to a typical expiratory spirogram 51. The spirogram record 51 is seen to be on conventional graph type paper having horizontal grid lines 52 and vertical grid lines 53 with the volume in liters plotted on the ordinate and time in seconds plotted on the abscissa. Tracing 55 is typical showing from time zero a steep portion 58 at the onset of the expiratory cycle, a horizontally curving portion 60 at the midpoint in the cycle, and a flat portion 62 at the end of the cycle.

The calculator 10 is shown in FIG. 2 measuring the flow rate near the onset of the tracing 55. Initially, a mark is made directly on the tracing at the point where the flow rate is to be calculated. Point 26, representing the intersection of line 16 and cross-hair 18, is then placed directly over the point on tracing 55 and disc 11 shifted so that line 16 achieves its best tangent "fit" with respect to the onset curve 58 adjacent the point. The operator then places his fingers in apertures 20 and 21 holding disc 11 in that position and with the other hand he rotates the tangent arm 14 until edge 32 is parallel with the horizontal grids 52 of spirogram 51. The indicator line 16 thus points at marks on the scales 22 and 24 representing the flow rate at point 26. This same procedure can be repeated to determine the flow rate at any point or average of points along the tracing 55 as described above.

It is possible that the arm 14 may be radially disposed rather than tangentially disposed as shown in the drawings. However, by tangentially disposing the arm 14, edge 32 may be longer than if the arm were radially disposed. It is possible to eliminate the arm 14 altogether and have just the concentric ring 30 about the central disc 11. The ring will have 90° lines 60 which can in use be aligned with horizontal grid lines. It will be apparent that when no arm 14 is provided more care must be exercised to be sure line 60 is parallel to the horizontal grid line to get the accurate results desired.

The scale 34 on the arm 14 may be employed for determining the half-way or quarter-way distances between the curve's maximum and minimum values. This is accomplished by aligning the 0 point of the scale 34 with the base line (0 volume) of the record and with the 100 point passing through the line containing the maximum point on the tracing. Then by drawing lines parallel to the base line through the 15%, 50% and the like points on the scale 34 the intersections of those lines with the tracing will be the 25%, 50% or the like points on the tracing. It is also possible that the arm 14 may be disposed so that it can be positioned in alignment with one of the ordinate grid lines 53 rather than the abscissa grid lines 52. This merely requires a shifting by 90° of all the scales markings on the annular scale portion 30. Caps or handles may also replace the holes 21 for the purpose of holding the central disc 11 firmly in position while rotating the tangent arm 14.

Various modifications are possible in the interconnection between the disc 11 and the scale 12 and several are shown in FIGS. 5, 6, 7 and 8. In FIGS. 5 and 6, a plurality of L-shaped tabs 63 are provided, at least three being required for location, which define recesses 64 that receive and locate the annular portion 30' with respect to the disc 11' while permitting rotation of the annular portion with respect thereto. The disc 11' has the indicator line 16 and cross-hair 18 enscribed on the lower face thereof so that the disc 11' with the line 16 and cross-hair 18 directly on the point to be measured, parallax is avoided, thereby providing a more accurate reading. The disc 11' can be held directly on the spirogram while the annular portion 30' is freely rotated into proper position.

In FIG. 7 the annular portion 30'' has a rectangular recess 66 which is slidably received on a rectangular tongue 68 which extends 360° about the inside of disc 11''. In the embodiment of FIG. 8 the annular portion 30''' has a peripheral V-shaped recess 70 which is slidably received on a male V-shaped tongue 72 formed on the inner periphery of the disc 11'''. In both embodiments the disc is slightly thicker so as to be positionable on the spirogram surface with the line 16 and cross-hair 18 directly over the point to be measured. The disc can then be held on the spirogram while the annular portion is rotated into proper aligned condition. In the form of invention shown in FIGS. 7 and 8 the disc and annular portion are made of a plastic material that can be deformed enough to pop the disc into the annular portion whereupon the material will return to its original condition and hold the disc in assembled relation with the annular portion.

I claim:

1. A manual computing device for determining air flow rates from a spirogram having two coordinates and a tracing, comprising: a first member engageable with the spirogram having line means thereon positionable so that the line means is coincident with the slope of the trace at a point or points thereon, a second member engageable with the spirogram movable with respect to said first member and having alignment means thereon so that the second member may be positioned in predetermined relation with the coordinates of the spirogram, indicia on one of said members representing flow rates, and indicating means on the other of said members cooperable with said indicia for providing a direct visual representation of air flow rate.

2. A manual computing device as defined in claim 1, wherein said first and second members are constructed of transparent plastic to permit the tracing to be viewed therethrough.

3. A manual computing device as defined in claim 1, wherein said first member is rotatably mounted with respect to said second member, means for holding said first member stationary with respect to said tracing while the second member is rotated to its predetermined position with respect to said coordinates.

4. A manual computing device as defined in claim 1, wherein said first member is annular in configuration, said line means being a diametral line on said first member, a portion of said diametral line defining said indicating means.

5. A manual computing device as defined in claim 1, wherein said first member is circular in configuration, said second member having an annular portion surrounding and pivotally mounted with respect to said first member, said second member having a second portion extending generally tangentially from said first portion to reduce the required length of the second portion.

6. A manual computing device as defined in claim 1, including means for holding said first member stationary with respect to said second member including openings in said first member of sufficient size to permit the insertion of at least a portion of the operator's fingers therethrough.

7. A manual computing device for determining air flow rate from a spirogram having two coordinates and a tracing, comprising: a first member of generally circular configuration having a diametral line thereacross positionable coincident with the slope of the portion of the tracing desired to be measured, apertures in said first member for employing the operator's fingers to hold the first member stationary with respect to the tracing, and a second member having an annular portion surrounding said circular first member, cooperable means on said members permitting relative movement therebetween including groove means on one of said members slidably receiving the other of said members, said second member having numerical indicia positioned to represent flow rate on the annular portion adjacent said first member, said line cooperating with said numerical indicia to provide a flow rate reading, said second member having a tangentially extending portion from said annular portion, said tangentially extending portion having a straight edge defining alignment means for alignment with one of the coordinates on the spirogram.

8. A manual computing device as defined in claim 7, wherein said circular member is overlayed on a portion of said annular portion, an annular ring fixed with respect to said circular member and seated within said annular portion to maintain alignment between said first and second members, fastener members extending through said first member and said ring each having projecting portions slidably receiving said annular portion.

9. A manual computing device as defined in claim 7, wherein said groove means includes a peripheral groove on said annular member and an interengaging tongue on said annular portion.

10. A manual computing device as defined in claim 7, wherein said first member extends slightly below the plane of said second member for holding said first member in position on said spirogram while said second member is rotated relative thereto.

11. A manual computing device for determining air flow rate from a spirogram having two coordinates and a tracing, comprising: a first member having line means thereon positionable so that the line means is coincident with the slope of the trace at a point or points thereon, a second member movable with respect to said first member and having alignment means thereon so that the second member may be positioned in predetermined relation with the coordinates of the spirogram, indicia on one of said members representing flow rates, and indicating means on the other of said members cooperable with said indicia for providing a visual representation of air flow rates, said first member being generally circular in configuration, said second member having a straight edge and being pivotally mounted with respect to said first member, said second member being substantially tangentially disposed with respect to said first member.

* * * * *

UNITED STATES PATENT OFFICE
CERTIFICATE OF CORRECTION

Patent No. 3,650,466     Dated March 21, 1972

Inventor(s) Daniel A. Talonn

It is certified that error appears in the above-identified patent and that said Letters Patent are hereby corrected as shown below:

Column 4, line 10, change "15%" to "25%".

Signed and sealed this 12th day of September 1972.

(SEAL)
Attest:

EDWARD M. FLETCHER, JR.
Attesting Officer

ROBERT GOTTSCHALK
Commissioner of Patents